United States Patent
Hu et al.

(10) Patent No.: US 7,840,752 B2
(45) Date of Patent: Nov. 23, 2010

(54) DYNAMIC DATABASE MEMORY MANAGEMENT POLICIES

(75) Inventors: Norbert Hu, Redmond, WA (US); Sethu M. Kalavakur, Redmond, WA (US); Anthony F. Voellm, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 11/589,664

(22) Filed: Oct. 30, 2006

(65) Prior Publication Data

US 2008/0104319 A1    May 1, 2008

(51) Int. Cl.
G06F 12/00 (2006.01)
G06F 13/00 (2006.01)

(52) U.S. Cl. .................. 711/113; 711/122; 711/135; 711/E12.017; 707/705

(58) Field of Classification Search .............. 711/113, 711/170; 707/1
See application file for complete search history.

(56) References Cited

U.S. PATENT DOCUMENTS

| | | | |
|---|---|---|---|
| 5,574,902 A | 11/1996 | Josten et al. | |
| 5,613,125 A * | 3/1997 | Nguyen et al. | 713/1 |
| 5,822,749 A | 10/1998 | Agarwal | |
| 5,826,253 A | 10/1998 | Bredenberg | |
| 5,895,488 A * | 4/1999 | Loechel | 711/135 |
| 6,351,749 B1 | 2/2002 | Brown et al. | |
| 6,470,423 B1 | 10/2002 | Ho et al. | |
| 6,567,823 B1 | 5/2003 | Rothschild | |
| 6,795,898 B2 | 9/2004 | Weinreb et al. | |
| 6,968,424 B1 * | 11/2005 | Danilak | 711/113 |
| 7,039,765 B1 * | 5/2006 | Wilkes | 711/133 |
| 7,124,252 B1 * | 10/2006 | Khare et al. | 711/137 |
| 7,337,281 B2 * | 2/2008 | Jin et al. | 711/143 |
| 2002/0046204 A1 | 4/2002 | Hayes | |
| 2002/0065948 A1 * | 5/2002 | Morris et al. | 709/318 |
| 2003/0140198 A1 * | 7/2003 | Ninose et al. | 711/122 |
| 2004/0088336 A1 * | 5/2004 | Pasupathy | 711/112 |
| 2004/0111557 A1 * | 6/2004 | Nakatani et al. | 711/113 |
| 2005/0044311 A1 * | 2/2005 | Lahiri et al. | 711/113 |
| 2005/0050074 A1 | 3/2005 | Jain et al. | |
| 2006/0036655 A1 * | 2/2006 | Lastovica, Jr. | 707/203 |
| 2006/0074872 A1 | 4/2006 | Gordon | |
| 2006/0085489 A1 | 4/2006 | Tomic et al. | |
| 2006/0149892 A1 * | 7/2006 | McFarling | 711/103 |

OTHER PUBLICATIONS

Chou, Hong-Tai, "An Evaluation of Buffer Management Strategies for Relational Database Systems", http://www.cs.berkeley.edu/~brewer/cs262/DBBufMgmt.pdf, Date: 1985.

(Continued)

*Primary Examiner*—Michael C Krofcheck (57) ABSTRACT

A database engine is provided with memory management policies to dynamically configure an area of memory called a buffer pool into which data pages are held during processing. The data pages are also buffered as an I/O (input/output) stream when read and written to a persistent storage medium, such as a hard disk, through use of a system file cache that is managed by the computer's operating system. The memory management policies implement capping the amount of memory used within the buffer pool to minimize the number of data pages that are double-buffered (i.e., held in both the buffer pool and system file cache). In addition, trimming data pages from the buffer pool, after the database engine completes all pending operations and requests, frees additional memory and further minimizes the number of processes associated with the database.

20 Claims, 7 Drawing Sheets

OTHER PUBLICATIONS

Cornell et al., "Integration of Buffer Management and Query Optimization in Relational Database Environment", Date: 1989, http://www.vldb.org/conf/1989/P247.PDF.

Stonebraker, Michael, "Operating System Support for Database Management", Date; Jul. 1981, vol. 24, No. 7, http://www.ics.uci.edu/~ics214a/handouts/stonebraker pdf.

* cited by examiner

DYNAMIC DATABASE MEMORY MANAGEMENT POLICIES

BACKGROUND

A relational database is a collection of related data that is organized in related two-dimensional tables of columns and rows. The data stored in a relational database is typically accessed by way of a user-defined query that is constructed in a query language such as Structured Query Language ("SQL"). SQL databases are generally organized using a fundamental storage unit of a data page where storage space, such as that provided by a hard disk, is logically divided into contiguously numbered data pages.

An SQL database engine is typically implemented using a database application (i.e., a software program that when run on a processor or computer allows for management of data and information structured as fields, records and files in the database). The SQL database engine provides, among other functionalities, the core service for running queries, processing data, and reading and writing pages to disk. Such database applications are operable on high-performance computers including specialized database server hardware. However, not all databases are implemented in such a manner. For example, some users may wish to use lower-cost and more general-purpose hardware such as personal computers ("PCs") that would typically host other applications in addition to the database. These other applications can be unpredictable in operation and widely vary in how they implement processes that utilize system and hardware resources such as memory. In some cases, such processes may reduce the ability of the computer's operating system to optimize the overall performance of the computer. Disk access on the lower cost general-purpose hardware is also generally much slower than access provided by the more specialized server hardware. Accordingly, database input/output ("I/O") and the PC's overall responsiveness may be reduced which can often negatively influence a user's perception of the interaction with the PC and the applications running on it.

This Background is provided to introduce a brief context for the Summary and Detailed Description that follows. This Background is not intended to be an aid in determining the scope of the claimed subject matter nor be viewed as limiting the claimed subject matter to only those implementations that may solve any or all of the disadvantages or problems presented above.

SUMMARY

A database engine running on a computer system is provided with memory management policies to dynamically configure an area of memory called a buffer pool into which data pages are held during processing. The data pages are also buffered as an I/O (input/output) stream when read and written to a persistent storage medium, such as a hard disk, through use of a system file cache that is managed by the computer's operating system. The memory management policies implement capping the amount of memory used for the data pages within the buffer pool to minimize the number of data pages that are double-buffered (i.e., held in both the buffer pool and file system cache). In addition, trimming data pages from the buffer pool, after the database engine completes all pending operations and requests, frees additional memory and further minimizes the number of processes associated with the database.

Buffering the I/O in the system file cache, capping the data pages within the buffer pool and trimming data pages when the database engine is idle reduces the memory footprint of the database application. Such reduction advantageously frees resources to enable the operating system to optimize the computer's overall performance but still maintains the benefit to database disk I/O that results from caching. As a result, the computer is responsive to database operations and disk access while enhancing the user's perceptions of the computer's performance by keeping the memory consumption of database processes small through the trimmed data pages. While generally applicable to most computer systems, optimization of the database application's memory footprint can be particularly beneficial to users wishing to use relatively low cost general-purpose computer systems as a database server.

This Summary is provided to introduce a selection of concepts in a simplified form that are further described below in the Detailed Description. The benefits and advantages noted in this Summary are not intended to limit the claimed subject matter to only those implementations that contain those benefits or advantages. In addition, this Summary is not intended to identify key features or essential features of the claimed subject matter, nor is it intended to be used as an aid in determining the scope of the claimed subject matter.

DETAILED DESCRIPTION

Caching is an important memory utilization and performance optimization that is commonly performed by applications and operating systems. The premise behind caching—which is also termed "buffering"—is that most applications frequently touch (i.e., access) a subset of data within one or more files. Bringing such data pages into memory, and keeping them there for the duration of the application's accesses minimizes the number of disk reads and writes the system must perform. Without caching, applications require relatively time consuming disk operations every time they access a file's data. Disk access is also "expensive" in terms of system resources that are expended.

Most modern operating systems employ a file cache (for example a "system file cache" under the Microsoft Windows® operating system) into which the I/O system maps recently used data from disk. When processes need to read from or write to the files mapped in the cache, an I/O manager copies the data from or to the cache, without persisting to disk, as if it were an array in memory. Because memory access is quicker than a disk operation, the cache provides an important performance boost to the processes.

Database applications are often arranged to manage all aspects of a computer system's operations including processes, I/O and memory operations. Some database applications, particularly those that are large and are intended for deployment in client-server type architectures, bypass use of the system file cache in favor of a specialized cache termed a buffer pool or "buffer cache". A buffer pool is an area of memory into which data pages in the database are read, modified, and held during processing. The use of a buffer pool typically improves database performance. As with a file cache, if a needed page of data is already in the buffer pool, that data page is accessed faster than if the data page had to be read directly from disk.

Database application control over system resources and the bypass of the system file cache are techniques that perform very satisfactorily in tightly-controlled environments where specific software applications are installed and their resource consumption carefully managed. However, in the case where a general-purpose computer system is used to support the database application such tight control of processes and resource consumption may not be possible. Less optimized database performance may result in such cases.

Figure 1:
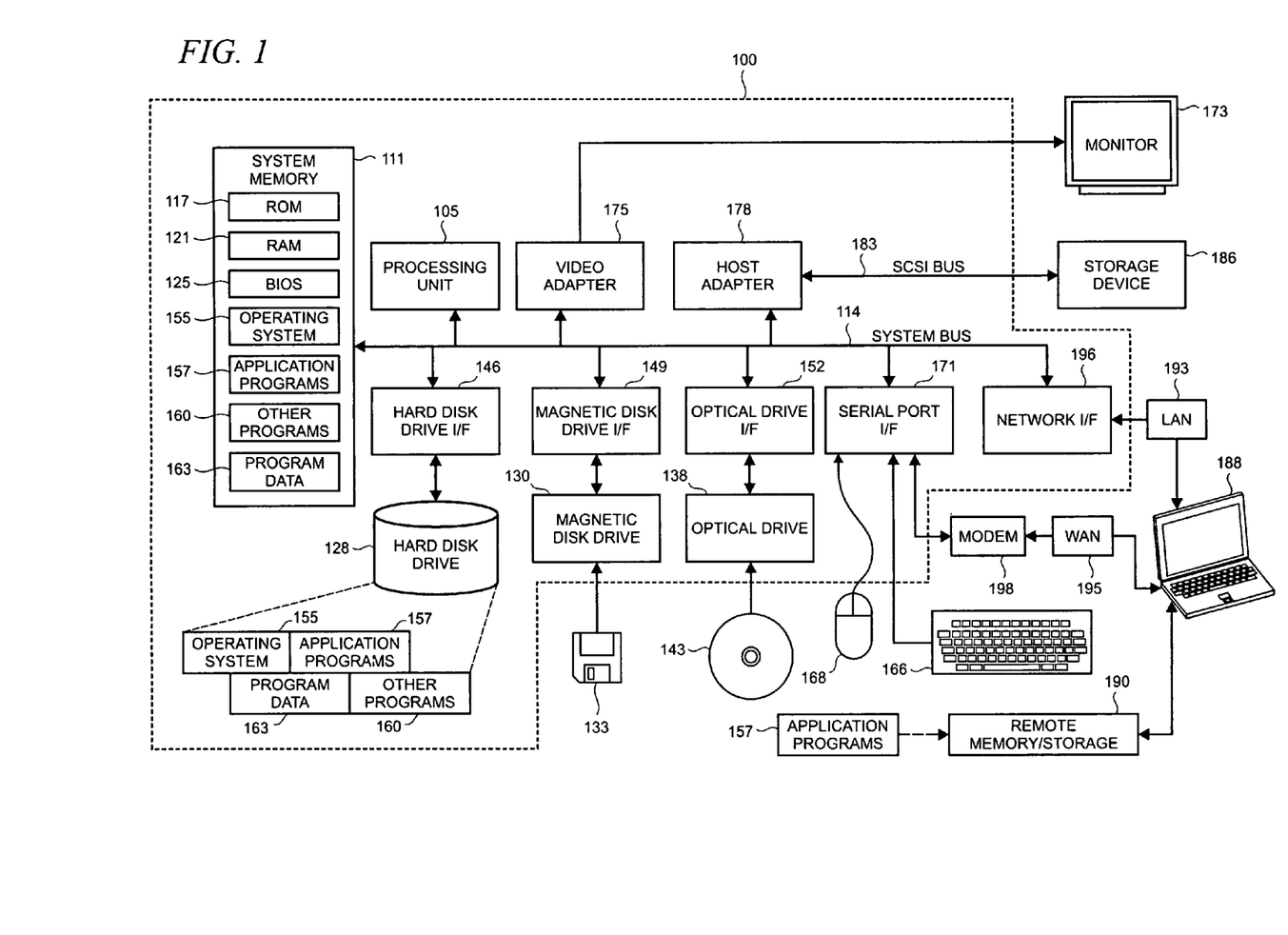
FIG. 1 is a simplified block diagram of an illustrative computer system environment in which the present dynamic database memory management policies may be implemented.

Turning now to the drawings in which like reference numerals indicate like elements, FIG. 1 is a simplified block diagram of an illustrative general purpose computer system 100 such as a personal computer ("PC") with which the present dynamic memory management policies may be implemented. Computer system 100 includes a processing unit 105, a system memory 111, and a system bus 114 that couples various system components including the system memory 111 to the processing unit 105. The system bus 114 may be any of several types of bus structures including a memory bus or memory controller, a peripheral bus, and a local bus using any of a variety of bus architectures. The system memory 111 includes read only memory ("ROM") 117 and random access memory ("RAM") 121. A basic input/output system ("BIOS") 125, containing the basic routines that help to transfer information between elements within the computer system 100, such as during start up, is stored in ROM 117. The computer system 100 may further include a hard disk drive 128 for reading from and writing to an internally disposed hard disk (not shown), a magnetic disk drive 130 for reading from or writing to a removable magnetic disk 133 (e.g., a floppy disk), and an optical disk drive 138 for reading from or writing to a removable optical disk 143 such as a CD (compact disc), DVD (digital versatile disc) or other optical media. The hard disk drive 128, magnetic disk drive 130, and optical disk drive 138 are connected to the system bus 114 by a hard disk drive interface 146, a magnetic disk drive interface 149, and an optical drive interface 152, respectively. The drives and their associated computer readable media provide non-volatile storage of computer readable instructions, data structures, program modules and other data for the computer system 100. Although this illustrative example shows a hard disk, a removable magnetic disk 133 and a removable optical disk 143, other types of computer readable media which can store data that is accessible by a computer such as magnetic cassettes, flash memory cards, digital video disks, data cartridges, random access memories ("RAMs"), read only memories ("ROMs") and the like may also be used in some applications of the present dynamic database memory management. In addition, as used herein, the term computer readable medium includes one or more instances of a media type (e.g., one or more magnetic disks, one or more CDs, etc.).

A number of program modules may be stored on the hard disk, magnetic disk 133, optical disc 143, ROM 117 or RAM 121, including an operating system 155, one or more application programs 157, other program modules 160 and program data 163. A user may enter commands and information into the computer system 100 through input devices such as a keyboard 166 and pointing device 168 such as a mouse. Other input devices (not shown) may include a microphone, joystick, game pad, satellite disk, scanner or the like. These and other input devices are often connected to the processing unit 105 through a serial port interface 171 that is coupled to the system bus 114, but may be connected by other interfaces, such as a parallel port, game port or universal serial bus ("USB"). A monitor 173 or other type of display device is also connected to the system bus 114 via an interface, such as a video adapter 175. In addition to the monitor 173, personal computers typically include other peripheral output devices (not shown), such as speakers and printers. The illustrative example shown in FIG. 1 also includes a host adapter 178, a Small Computer System Interface ("SCSI") bus 183, and an external storage device 186 connected to the SCSI bus 183.

The computer system 100 is operable in a networked environment using logical connections to one or more remote computers, such as a remote computer 188. The remote computer 188 may be selected as another personal computer, a server, a router, a network PC, a peer device or other common network node, and typically includes many or all of the elements described above relative to the computer system 100, although only a single representative remote memory/storage device 190 is shown in FIG. 1. The logical connections depicted in FIG. 1 include a local area network ("LAN") 193 and a wide area network ("WAN") 195. Such networking environments are often deployed, for example, in offices, enterprise-wide computer networks, intranets and the Internet.

When used in a LAN networking environment, the computer 100 is connected to the local area network 193 through a network interface or adapter 196. When used in a WAN networking environment, the computer system 100 typically includes a broadband modem 198, network gateway or other means for establishing communications over the wide area network 195, such as the Internet. The broadband modem 198, which may be internal or external, is connected to the system bus 114 via the serial port interface 171. In a networked environment, program modules related to the computer system 100, or portions thereof, may be stored in the remote memory storage device 190. It is noted that the network connections shown in FIG. 1 are illustrative and other means of establishing a communications link between the computers may be used depending on the specific requirements of an application of database memory management.

Figure 2:
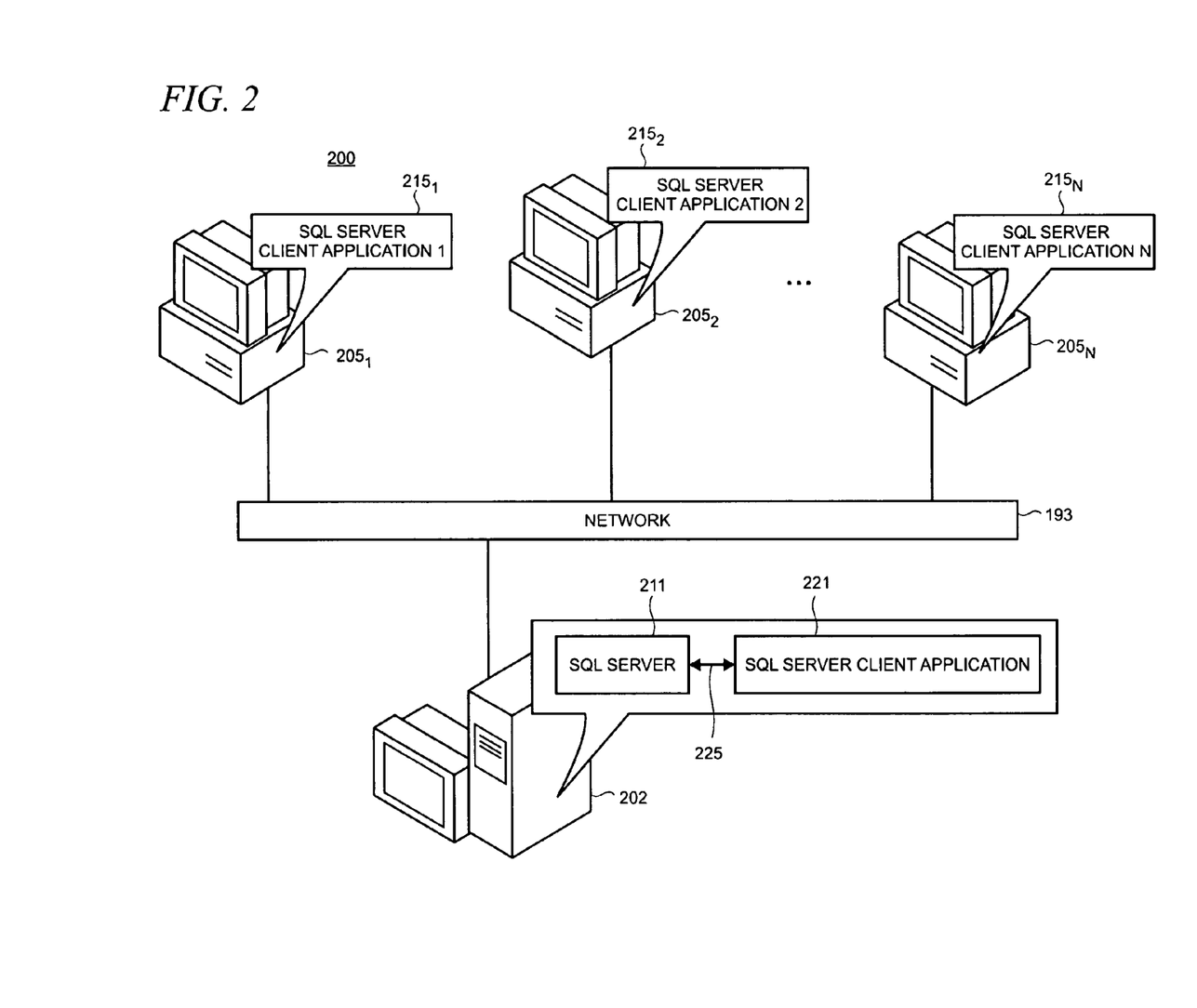
FIG. 2 is a pictorial view of an illustrative network environment in which the present dynamic database memory management policies may be implemented.

FIG. 2 is a pictorial view of an illustrative network environment 200 in which the present dynamic database memory management policies may be implemented. The illustrative network environment 200 shows the typical client-server type architecture that is used to implement a relational database (simply called a "database" in the description that follows) that is stored on and served from a central server 202 and accessed by a plurality of client computers $205_1$, $205_2$ ... $205_N$ over a network (e.g., local area network 193 as shown in FIG. 1). In this illustrative example, the server 202 and clients 205 are each implemented using a computer system that is arranged with similar features and functionalities as computer system 100 shown in FIG. 1 and described in the accompanying text. More specifically, server 202 is arranged as a relatively low-cost and general-purpose computer system that is configured, in this illustrative example, to run multiple applications beyond merely a database application. Accordingly, as noted above, absent application of the techniques provided by the present dynamic database memory management techniques, the potential for reduced database performance and overall server performance would exist.

A variety of database types are contemplated as being suitable for use with the present dynamic database memory management including databases implemented using the Microsoft SQL Server database application. In the illustrative network environment 200 shown in FIG. 2, an instance of SQL Server is operative on server 202 as indicated by reference numeral 211.

When the users at the clients 205 want to access the database on the server 202, they run an application on the client computer 205, which in this case is a SQL Server client application 215. Each instance of the SQL Server client application $215_{1-N}$ typically provides its respective client computer $205_{1-N}$ with the logic and code required to formulate queries and display output to the user among other functionalities.

In some settings, it may be desirable to run the database application locally (i.e., not in a network environment). The SQL Server application 211 and an instance of SQL Server client application 221 are then arranged to operate on a single computer (i.e., server 202). In this case, the SQL server client application communicates to SQL server using various inter-process communications components indicated by line 225 instead of using network 193.

Figure 3:
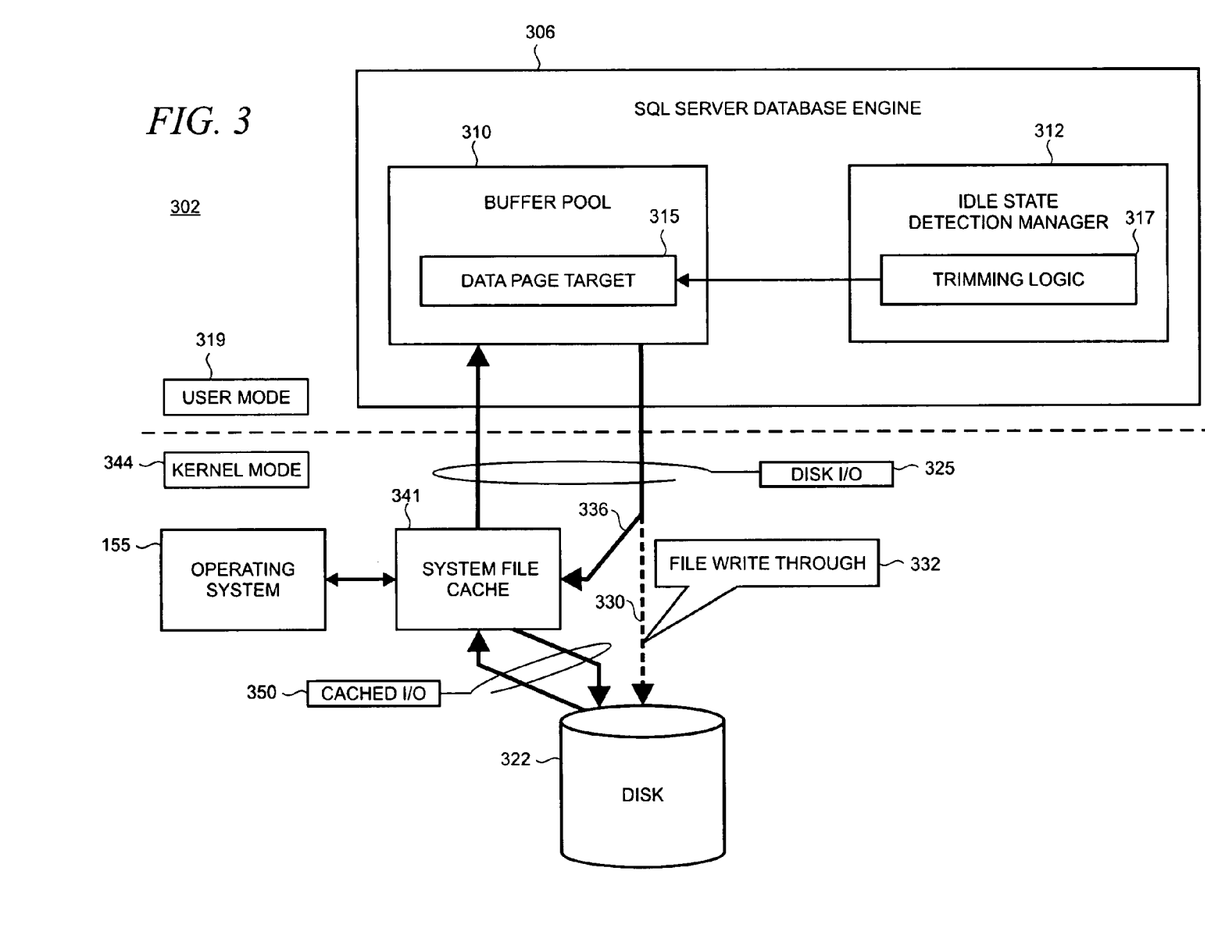
FIG. 3 is a simplified block diagram of an illustrative memory management architecture that may be used to implement the present dynamic database memory management policies.

FIG. 3 is a block diagram of an illustrative memory management architecture 302 that may be used to implement the present dynamic database memory management policies. Architecture 302 includes a database engine which, in this illustrative example, is arranged as a SQL Server database engine 306 as implemented by the SQL Server application that operates on server 202 (FIG. 2). The SQL Server database engine 306 provides a core service for storing, processing, and securing data pages in the database implemented by SQL Server on server 202. The service provided by the SQL Server database engine 306 is typically supplemented with additional services implemented by the SQL Server application including various data reporting, integration, and analysis services (not shown).

SQL Server database engine 306 is configured with a buffer pool 310 and a database engine idle detection manager 312. Buffer pool 310 and database idle detection manager 312 operate together to provide buffer management for the SQL Server database engine 306. In the present arrangement, the buffer pool 310 is capped to some fixed amount of the available memory installed in server 202, as described below in the text accompanying FIGS. 6 and 7. Processes associated with the buffer pool 310 address memory in the user mode (i.e., application) partition as indicated by reference numeral 319.

Buffer pool 310 is arranged to buffer recently accessed data pages to reduce the need for disk I/O. Buffer pool 310 is further operatively coupled to a disk 322 (e.g., the hard disk in hard disk drive 128 in FIG. 1) so that the SQL Server database engine 306 is capable of storing and retrieving data pages on the disk 322. Buffer pool 310 is also arranged with a data page target 315 which the SQL Server database engine 306 reserves in the addressable memory space. The data page target 315 is arranged to set an upper limit for data pages buffered in the buffer pool 310.

The idle state detection manager 312 is arranged to determine the workload (i.e., a measure of the level of server operations, processes and activities required to process queries, updates, and requests, for example) that is borne by the SQL Server database engine 306. In some applications of dynamic memory management, the idle state detection manager 312 may be configured to monitor activities as necessary to detect the occurrence of the SQL Server database engine 306 entering an "idle" state. Such idle state is considered entered, for example, when there are no current user requests (e.g., queries), current external requests or pending operations. However, some internal background tasks may normally still run while the SQL server database engine 306 is considered idle. The idle state detection manager 312 includes trimming logic 317 which acts on the data page target 315 as described below in the text accompanying FIG. 6.

The disk I/O stream 325 is provided with two write paths. The first write path is a direct flush to disk path 330. This path is enabled, for example in the Microsoft Windows operating system, by setting the FILE_FLAG_WRITE_THROUGH flag, as indicated by reference numeral 332 in FIG. 3, so that the CreateFile( ) function under the Win32 API (application programming interface) writes the data page directly to disk. Such direct flush to disk path 330 provides for an additional measure of data security by directly persisting database changes to the permanent storage afforded by the disk.

The second write path in the disk I/O stream 325 is a system file cache path 336. Data pages from the buffer pool 310 are buffered in a system file cache 341. The system file cache 341 is an area of memory which is addressed in the kernel mode (i.e., operating system) partition 344. It typically stores recently used data for all of the applications 157 (FIG. 1) that are running on the server 202 for quick access. The size of the system file cache 341 depends on the amount of physical memory installed and the memory required for applications 157. The operating system 155 dynamically adjusts the size of the system file cache as needed, sharing memory optimally between the applications' processes and the cached data.

As noted above, database applications traditionally bypass the system file cache in favor of the buffer pool addressed in user mode. By contrast, the present database memory management policies employ both the system file cache 341 and buffer pool 310 to buffer data pages. Accordingly, if a data page is required and it is not stored in the buffer pool 310, the SQL Server database engine 306 will try to access the data page held in the system file cache 341 before needing to go to the disk 322 for the required data. The data pages in the system file cache 341 are read from and written to disk 322 as the cached I/O stream 350 as shown in FIG. 3.

Figure 4:
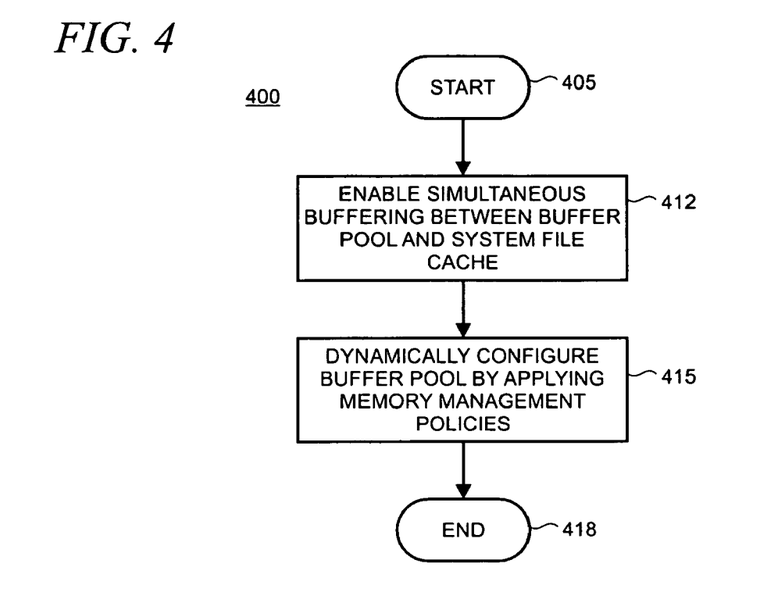
FIG. 4 is a flowchart for an illustrative method that may be performed using the memory management architecture shown in FIG. 3.

FIG. 4 is a flowchart for an illustrative method 400 that may be performed using the memory management architecture 302 (FIG. 3). The method 400 starts at block 405. At block 412, simultaneous utilization of both the system file cache 341 and the buffer pool 310 to buffer disk I/O are enabled. In this step the SQL Server database engine 306 sets the maximum targeted data page within the buffer pool 310 with a capped size. It also uses the default system file cache 341 managed by the operating system 155 so that operating system 155 buffers the disk I/O stream 325 in the system file cache 341. At block 415, the SQL Server database engine dynamically configures the buffer pool 310 by applying one or more memory management policies. Method 400 ends at block 418.

Figure 5:
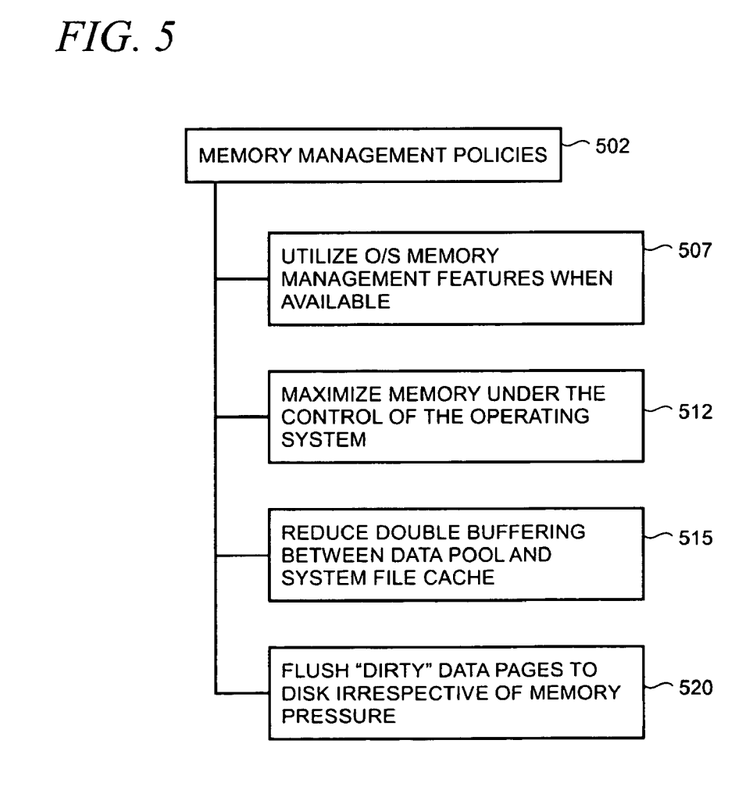
FIG. 5 shows several illustrative memory management policies that may be applied by the method shown in FIG. 4.

FIG. 5 shows several illustrative memory management policies 502 that may be applied by method 400 (FIG. 4). Policy 507 includes utilizing memory management features that are provided by the operating system (e.g., operating system 155 in FIGS. 1 and 3). For example, the Microsoft Windows Vista™ operating system employs a technology called "SuperFetch" that uses intelligent prioritization schemes which understand which applications (e.g., applications 157 in FIG. 1) and data files are used most often on a computer (e.g., computer system 100 in FIG. 1). The technology can also differentiate which applications are most likely to be used at different times and can also prioritize applications over background tasks to improve disk I/O and increase overall system responsiveness.

Policy 512 includes maximizing the amount of memory that is available to the operating system 155 to enable it to choose which data pages are important and should thus be buffered in the system file cache 341 (FIG. 3). This may be beneficial to avoid displacing physical memory pages on the system and reducing the impact on other applications running on the computer system 100 that would occur when their memory pages are displaced in physical memory.

Policy 515 includes minimizing the amount of double buffering (i.e., duplicative buffering of the same data pages) between the system file cache 341 and the buffer pool 310. Although the present arrangement anticipates some double buffering will necessarily occur at times and is thus accepted, implementation of policy 515 configures the buffer pool to be relatively small as described in the text accompanying FIG. 7 to control the number of duplicate data pages on the computer system 100.

Policy 520 includes flushing dirty data pages from the buffer pool 310 to disk (e.g., disk 322 in FIG. 3) irrespective of memory pressure that is either internally imposed by operation of the SQL Server database engine 306 (FIG. 3) or that is imposed by the operating system 155. A dirty page is a data page that has been modified during processing by the SQL Server database engine 306. One disadvantage in waiting for such memory pressure is that launch of the other applications 157 (FIG. 1) and other memory-hungry applications will take longer because they would otherwise need to wait for the SQL Server database engine 306 to give up memory. This often requires the use of processor cycles and waiting for disk I/O.

In addition if a database engine is holding onto memory in the buffer pool, the remaining available memory may be exceeded by the sum of other applications' working sets (the portion of the address space that is currently resident in the physical memory and addressed by processes in the application). In such cases, as the applications fight to maintain their working set size, the operating system switches between the applications and often has to copy each application's data to and from disk as well as copy programming code from disk to memory. Such disk access can be time consuming and slow down application execution considerably. Thus, the overall impact of waiting for memory to be released from the database can be a negative user perception of computer responsiveness, particularly with the lower-cost general-purpose computer systems as employed in this illustrative example.

Figure 6:
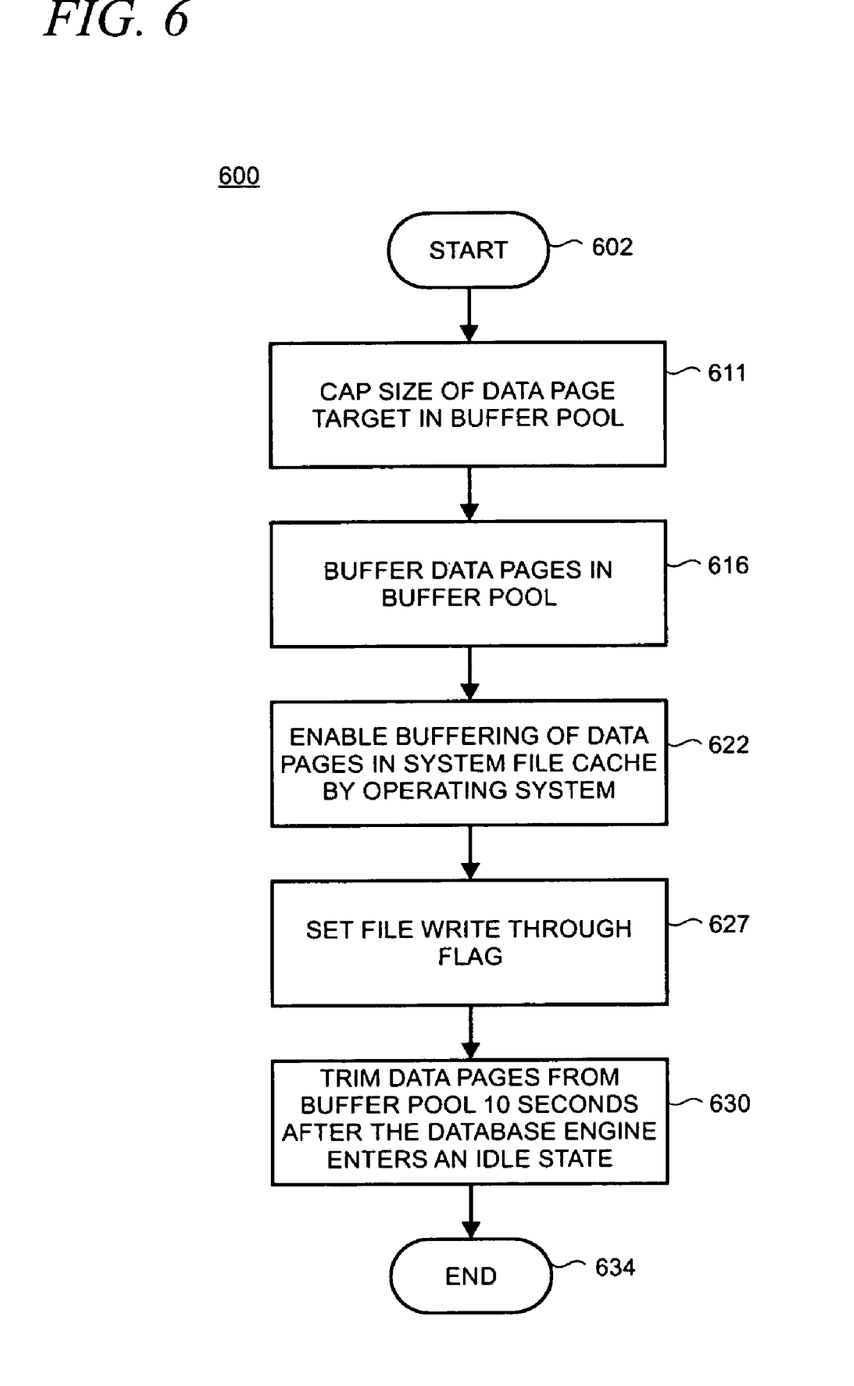
FIG. 6 is a flowchart of an illustrative method that may be used to implement the memory management policies shown in FIG. 5.

FIG. 6 is a flowchart of an illustrative method 600 that may be used to implement the memory management policies shown in FIG. 5 and described in the accompanying text. It is noted that method 600 is one illustrative and specific way to implement the memory management polices, but other methods may also be used, for example, by using combinations of the techniques described below. It is further noted that method 600 includes a number of steps. Unless otherwise noted, the sequence of the steps may be varied from that shown. The method 600 starts at block 602.

Figure 7:
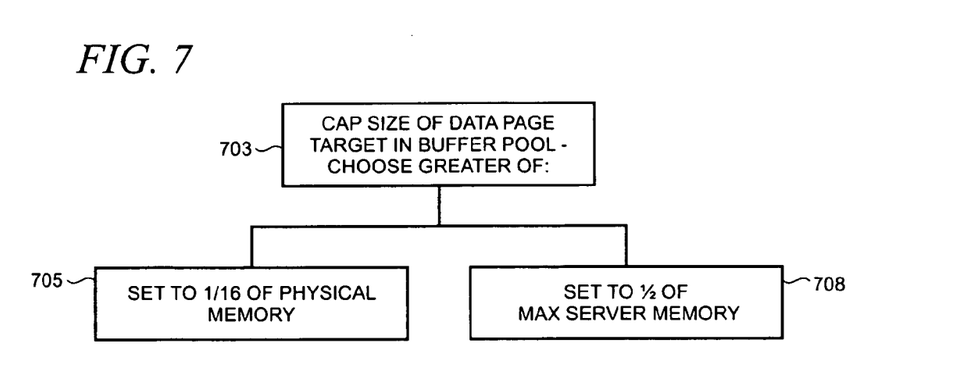
FIG. 7 shows two memory dimensions that are considered when determining the size of a cap for a buffer pool.

At block 611, the data page target within a buffer pool (e.g., data page target 315 in buffer pool 310 as shown in FIG. 3) is capped to reduce the occurrence of double-buffered data pages and free up memory for operating system use. Referring to FIG. 7, two dimensions are considered for determining the cap size for the data page target in the buffer pool. As indicated by block 703, the greater of the two is selected. The dimensions include $1/16^{th}$ of the size of the available physical memory 705 and one-half of the max server memory option 708. The "max server memory" is an option implemented in SQL Server that enables a user to select the amount of memory allowed for the buffer pool used by an instance of SQL Server. However, other database applications use similar user-configurable buffer pool sizes. Note that the values of one-half and $1/16^{th}$ for the physical memory and max server memory option, respectively, can be expected to provide an optimized buffer pool size in many typical applications where the present database memory management polices are applied. However, other values may be selected according to the specific requirements of a particular setting.

Figure 8:
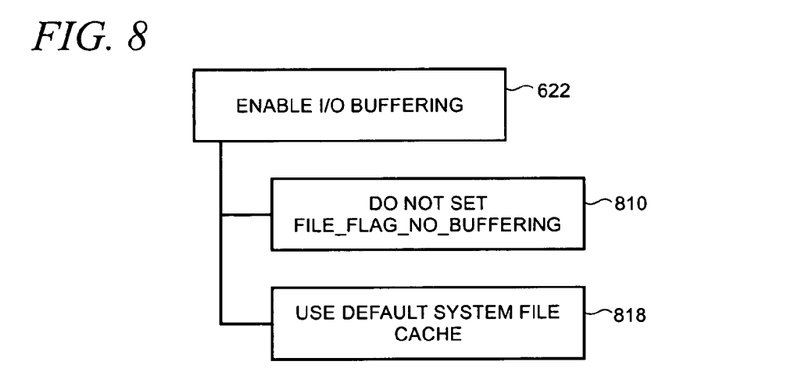
FIG. 8 shows components forming a step of enabling use of a system file cache.

Referring again to FIG. 6, at block 616 data pages are buffered into the capped buffer pool 310. At block 622 use of the system file cache (e.g., system file cache 341 in FIG. 3) is enabled so that the disk I/O may be buffered by the operating system (e.g., operating system 155 in FIGS. 1 and 3). Note that the system file cache 341 is typically configured to be used by applications by default, unless a FILE_FLAG_NO_BUFFERING flag is set, which guarantees that all reads will come from a file on disk and not from any buffer or cache in the operating system. Accordingly, as shown in FIG. 8, the system file cache enablement step 622 includes not setting the no buffering flag, as indicated by reference numeral 810 so that the default system file cache is utilized, as indicated by reference numeral 818.

Referring again to FIG. 6, block 627 indicates that the FILE_WRITE_THROUGH flag is set so that dirty data pages are flushed directly to disk in addition to being buffered as I/O in the system file cache 341.

At block 630, data pages are trimmed from the buffer pool 310. Here, the trimming logic 317 in the idle state detection manager 312 acts on the data page target 315 (FIG. 3) to thereby trim data pages from the data pool 310 after a time interval of approximately 10 seconds has elapsed once the idle state detection manager 312 determines that the SQL Server database engine 306 is idle and is not bearing a workload. The trimming is performed iteratively and dynamically as various data pages are processed over time, are read from and written to disk, and buffered in response to user interaction with the database.

The 10 second value is selected so that user activity is not substantially impacted by the trimming operation. Note that the 10 second value can be expected to provide an optimized buffer memory footprint in many typical applications where the present database memory management policies are applied. However, other values may be selected according to the specific requirements of a particular setting.

Figure 9:
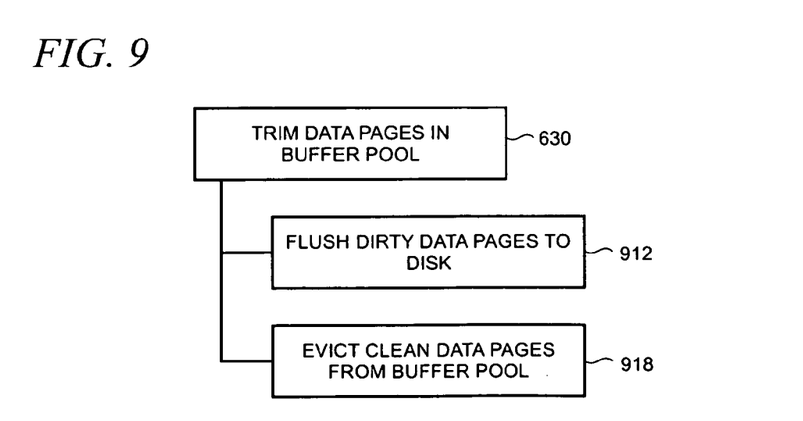
FIG. 9 shows components forming a step of trimming data pages from a buffer pool.

As shown in FIG. 9, the trimming step 630 includes flushing dirty pages from the buffer pool 310 to disk 322 as indicated by reference numeral 912. As noted above, a dirty page is a data page that has been modified during processing by the SQL Server database engine 306. The trimming step 630 further includes dropping (i.e., evicting) all clean data pages from the buffer pool 310 as indicated by reference numeral 918. A clean data page is a data page that was not modified during processing by the SQL Server database engine 306. The illustrative method 600 ends at block 634.

Figure 10:
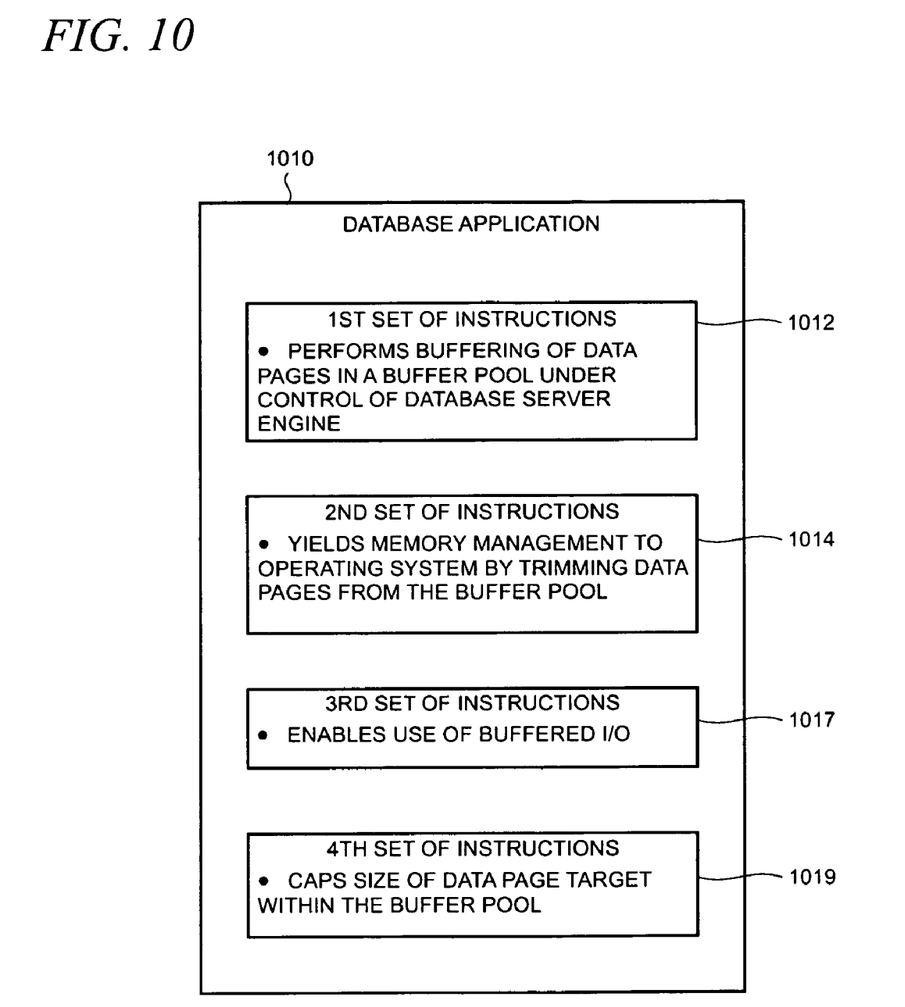
FIG. 10 is a simplified block diagram of a database application that includes a plurality of instruction sets for implementing the present dynamic database memory management policies.

FIG. 10 is a simplified block diagram of a database application 1010 that includes a plurality of instruction sets 1012, 1014, 1017 and 1019 that are typically stored on a computer-readable medium that, when carried out by a processor implement one or more of the present dynamic database memory management policies. A first set of instructions 1012 includes instructions for performing buffering of data pages in a data pool (e.g., data pool 310 in FIG. 3), for example under control of a database engine (e.g., SQL Server database engine 306 in FIG. 3) as described in the text accompanying FIG. 6. A second set of instructions 1014 includes instructions for yielding memory management to an operating system (e.g., operating system 155 in FIGS. 1 and 3), for example, by trimming data pages from the data pool 310 as described in the text accompanying FIGS. 6 and 9. A third set of instructions 1017 includes instructions for enabling use of buffered I/O, for example, through use of a system file cache (e.g., system file cache 341 in FIG. 3) as described in the text accompanying FIGS. 6 and 8. A fourth set of instructions 1019 includes instructions for capping the size of the data page target used for a buffer pool 310 (e.g., the data page target 315 in buffer pool 310 in FIG. 3), for example, as described in the text accompanying FIGS. 6 and 7. It is noted that the database application 1010 may be alternatively arranged to include single instances of the instruction sets described above, or various combinations of two or three instruction sets as required by a particular application of database memory management.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing a database stored on a persistent storage medium, the method comprising the steps of:

enabling, at a computing device running a database application and one or more other applications, both a kernel mode system file cache of an operating system of the computing device and a user mode buffer pool of a database engine of the database application buffering data pages retrieved by the database engine from the persistent storage medium of the computing device, the user mode buffer pool being implemented using a memory resource in user mode that is also accessible by the kernel mode system file cache of the operating system, the kernel mode system file cache being implemented using a memory resource in kernel mode that is also accessible from user mode by the database application and the one or more other applications running on the computing device, wherein enabling the kernel mode system file cache and the user mode buffer pool for buffering comprises:

setting, by the database engine, a maximum data page target for the user mode buffer pool to impose an upper limit on the number of data pages that are buffered in the user mode buffer pool such that a memory size of the user mode buffer pool is smaller relative to a memory size of the kernel mode system file cache in order to minimize duplicative buffering of data pages by the user mode buffer pool and the kernel mode system file cache;

enabling, from the user mode buffer pool, a direct flush write path to the persistent storage medium;

providing, from the user mode buffer pool, a system file cache write path buffering data pages from the user mode buffer pool to the kernel mode system file cache; and providing, from the kernel mode system file cache, a cached input/output (I/O) stream to the persistent storage medium enabling the kernel mode system file cache to directly read data pages from and write data pages to the persistent storage medium;

retrieving, by the database engine, data pages stored on the persistent storage medium of the computing device;

buffering, by the database engine, the data pages retrieved from the persistent storage medium of the computing device into the user mode buffer pool;

writing, by the database engine, the data pages from user mode buffer pool to the persistent storage medium via the direct flush write path as a disk I/O stream to the persistent storage medium;

buffering, by the operating system, the data pages of the disk I/O stream into the kernel mode system file cache;

trimming, by the database engine, data pages from the user mode buffer pool to maximize free memory in the memory resource in the user mode in response to detection of the database engine entering an idle state;

determining, by the database engine, whether a required data page that has been trimmed from the user mode buffer pool is held in the kernel mode system file cache; and retrieving, by the database engine, the required data page from the kernel mode system file cache when the required data page is held in the kernel mode system file cache.

2. The method of claim 1, wherein the direct flush write path is enabled in the operating system by setting a write through flag so that dirty data pages are flushed directly to the persistent storage medium in addition to being buffered in the kernel mode system file cache.

3. The method of claim 1, wherein the memory size of the user mode buffer pool size limit is approximately one-sixteenth of available physical memory of the computing device.

4. The method of claim 1, wherein the memory size of the user mode buffer pool is approximately one-half of a user-selectable value for a maximum size of the user mode buffer pool.

5. The method of claim 1, wherein the database engine comprises idle detection logic for determining whether any operations or requests are pending.

6. The method of claim 1, wherein the persistent storage medium is a hard disk of the computing device.

7. The method of claim 1, wherein log files associated with the data pages are excluded from buffering.

8. The method of claim 1, wherein the database engine retrieves the required data page from the persistent storage medium when the required data page is not held in the kernel mode system file cache.

9. The method of claim 1, wherein trimming the data pages from the user mode buffer pool is delayed by a pre-determined time interval after detection of the database engine entering the idle state.

10. The method of claim 1, wherein the database engine comprises a Structured Query Language database engine.

11. A computer-readable storage medium containing instructions which, when executed by one or more processors of a computing device, causes the computing device to perform a method for managing a database stored on a persistent storage medium, the method comprising the steps of:

enabling, at a computing device running a database application and one or more other applications, both a kernel mode system file cache of an operating system of the computing device and a user mode buffer pool of a database engine of the database application buffering data pages retrieved by the database engine from the persistent storage medium of the computing device, the user mode buffer pool implemented using a memory resource in user mode that is also accessible by the kernel mode system file cache of the operating system, the kernel mode system file cache being implemented using a memory resource in kernel mode that is also accessible from user mode by the database application and the one or more other applications running on the computing device, wherein enabling the kernel mode system file cache and the user mode buffer pool for buffering comprises:

setting, by the database engine, a maximum data page target for the user mode buffer pool to impose an upper limit on the number of data pages that are buffered in the user mode buffer pool such that a memory size of the user mode buffer pool is smaller relative to a memory size of the kernel mode system file cache in order to minimize duplicative buffering of data pages by the user mode buffer pool and the kernel mode system file cache;

enabling, from the user mode buffer pool, a direct flush write path from the buffer pool to the persistent storage medium;

providing, from the user mode buffer pool, a system file cache write path buffering data pages from the user mode buffer pool to the kernel mode system file cache; and providing, from the kernel mode system file cache, a cached input/output (I/O) stream to the persistent storage medium enabling the kernel mode system file cache to directly read data pages from and write data pages to the persistent storage medium;

retrieving, by the database engine, data pages stored on the persistent storage medium of the computing device;

buffering, by the database engine, the data pages retrieved from the persistent storage medium of the computing device into the user mode buffer pool;

writing, by the database engine, the data pages from user mode buffer pool to the persistent storage medium via the direct flush write path as a disk I/O stream to the persistent storage medium;

buffering, by the operating system, the data pages of the disk I/O stream into the kernel mode system file cache;

trimming, by the database engine, data pages from the user mode buffer pool to maximize free memory in the memory resource in the user mode in response to detection of the database engine entering an idle state;

determining, by the database engine, whether a required data page that has been trimmed from the user mode buffer pool is held in the kernel mode system file cache; and retrieving, by the database engine, the required data page from the kernel mode system file cache when the required data page is held in the kernel mode system file cache.

12. The computer-readable storage medium of claim 11, wherein enabling the kernel mode system file cache for buffering further comprises not setting a buffer bypass flag to a file operation application programming interface (API) function.

13. The computer-readable storage medium of claim 11, wherein trimming the data pages from the user mode buffer pool is delayed by a pre-determined time interval after detection of the database engine entering the idle state.

14. The computer-readable storage medium of claim 11, wherein the memory size of the user mode buffer pool is one of: approximately one-sixteenth of available physical memory of the computing device or approximately one-half of a user-selectable value for a maximum size of the user mode buffer pool.

15. The computer-readable storage medium of claim 11, wherein the idle state comprises a state that is entered upon completion of all outstanding operations, the outstanding operations including a query.

16. The computer-readable storage medium of claim 11, wherein the database engine retrieves the required data page from the persistent storage medium when the required data page is not held in the kernel mode system file cache.

17. The computer-readable storage medium of claim 11, wherein the database engine comprises a Structured Query Language database engine.

18. A computing device comprising:
a persistent storage medium storing a database;
memory storing computer executable instructions;
one or more processors executing said computer executable instructions running a database application and one or more other applications and causing the computing device to perform method for managing the database stored on the persistent storage medium, the method comprising the steps of:

enabling, at the computing device, both a kernel mode system file cache of an operating system of the computing device and a user mode buffer pool of a database engine of the database application buffering data pages retrieved by the database engine from the persistent storage medium of the computing device, the user mode buffer pool being implemented using a memory resource in user mode that is also accessible by the kernel mode system file cache of the operating system, the kernel mode system file cache being implemented using a memory resource in kernel mode that is also accessible from user mode by the database application and the one or more other applications running on the computing device, wherein enabling the kernel mode system file cache and the user mode buffer pool for buffering comprises:

setting, by the database engine, a maximum data page target for the user mode buffer pool to impose an upper limit on the number of data pages that are buffered in the user mode buffer pool such that a memory size of the user mode buffer pool is smaller relative to a memory size of the kernel mode system file cache in order to minimize duplicative buffering of data pages by the user mode buffer pool and the kernel mode system file cache;

enabling, from the user mode buffer pool, a direct flush write path to the persistent storage medium;

providing, from the user mode buffer pool, a system file cache write path buffering data pages from the user mode buffer pool to the kernel mode system file cache; and providing, from the kernel mode system file cache, a cached input/output (I/O) stream to the persistent storage medium enabling the kernel mode system file cache to directly read data pages from and write data pages to the persistent storage medium;

retrieving, by the database engine, data pages stored on the persistent storage medium of the computing device;

buffering, by the database engine, the data pages retrieved from the persistent storage medium of the computing device into the user mode buffer pool;

writing, by the database engine, the data pages from user mode buffer pool to the persistent storage medium via the direct flush write path as a disk I/O stream to the persistent storage medium;

buffering, by the operating system, the data pages of the disk I/O stream into the kernel mode system file cache;

trimming, by the database engine, data pages from the user mode buffer pool to maximize free memory in the memory resource in the user mode in response to detection of the database engine entering an idle state;

determining, by the database engine, whether a required data page that has been trimmed from the user mode buffer pool is held in the kernel mode system file cache; and retrieving, by the database engine, the required data page from the kernel mode system file cache when the required data page is held in the kernel mode system file cache.

19. The computing device of claim 18, wherein the database engine retrieves the required data page from the persistent storage medium when the required data page is not held in the kernel mode system file cache.

20. The computing device of claim 18, wherein trimming the data pages from the user mode buffer pool is delayed by a pre-determined time interval after detection of the database engine entering the idle state.

* * * * *

UNITED STATES PATENT AND TRADEMARK OFFICE
CERTIFICATE OF CORRECTION

PATENT NO. : 7,840,752 B2
APPLICATION NO. : 11/589664
DATED : November 23, 2010
INVENTOR(S) : Norbert Y. Hu et al.

It is certified that error appears in the above-identified patent and that said Letters Patent is hereby corrected as shown below:

In column 10, line 45, in Claim 3, after "pool" delete "size limit".

Signed and Sealed this
Twenty-sixth Day of July, 2011

David J. Kappos
*Director of the United States Patent and Trademark Office*